(12) United States Patent
Moore et al.

(10) Patent No.: US 8,010,898 B2
(45) Date of Patent: Aug. 30, 2011

(54) PROCESS OF SPECIFYING PRINT TIME FOLD METHOD, LOCATION, AND ORIENTATION

(75) Inventors: Timothy G. Moore, Phoenix, AZ (US); Randall F. Watterson, Glendale, AZ (US); Wim Van Grimbergen, Belfeld (NL); Paul Sluzek, Grubbenvorst (NL); Jason G. Stasiak, Gilbert, AZ (US); William Marvin Grasser, II, Mesa, AZ (US); Scot A. Bryant, Tempe, AZ (US)

(73) Assignee: OCE-Technologies B.V., Venlo (NL)

( * ) Notice: Subject to any disclaimer, the term of this patent is extended or adjusted under 35 U.S.C. 154(b) by 881 days.

(21) Appl. No.: 11/987,416

(22) Filed: Nov. 29, 2007

(65) Prior Publication Data
US 2008/0147210 A1    Jun. 19, 2008

Related U.S. Application Data

(60) Provisional application No. 60/861,724, filed on Nov. 30, 2006.

(51) Int. Cl.
*G06F 17/00* (2006.01)

(52) U.S. Cl. ........................................ 715/274

(58) Field of Classification Search ................. 715/274, 715/273, 255; 358/1.9
See application file for complete search history.

(56) References Cited

U.S. PATENT DOCUMENTS

| | | | | |
|---|---|---|---|---|
| 5,052,834 | A * | 10/1991 | Feistel et al. | 358/1.8 |
| 5,762,561 | A * | 6/1998 | Zine | 473/131 |
| 6,608,919 | B1 * | 8/2003 | Alattar | 382/135 |
| 6,859,287 | B1 * | 2/2005 | Frederiksen et al. | 358/1.12 |
| 7,086,001 | B1 * | 8/2006 | Hicks et al. | 715/209 |
| 7,814,430 | B2 * | 10/2010 | McComber | 715/771 |
| 2003/0056180 | A1 * | 3/2003 | Mori | 715/530 |
| 2006/0114487 | A1 * | 6/2006 | Caveney et al. | 358/1.13 |
| 2006/0164526 | A1 * | 7/2006 | Suzuki et al. | 348/239 |
| 2008/0297811 | A1 * | 12/2008 | Pierce et al. | 358/1.6 |

* cited by examiner

*Primary Examiner* — Laurie Ries
(74) *Attorney, Agent, or Firm* — Birch, Stewart, Kolasch & Birch, LLP (57) ABSTRACT

A method for specifying a folding option for a print job includes displaying a file from the print job, after selection by a user for printing, the file comprising a legend, opening the file in a preview window, displaying markers in corners of the preview window, reading out a user selected marker, after selection of a displayed marker by a user, reading out a number of user set preprogrammed fold variables from a list of preprogrammed fold variables, and folding based on the user selected marker and the number of user set preprogrammed fold variables.

5 Claims, 8 Drawing Sheets

| File | Edit | View | Tools | Help |

Job Center

Incoming — 34

| Folders | Order ID | From | Received | Documents | Set Count |
|---|---|---|---|---|---|
| – Job Center | –+Delivery Method: Local Delivery Service | | | | |
| — Incoming | -1-03-1 | jan Jacobs | 5/18/2006 | 1 | 1 |
| –+ Completed | –+ Delivery Method: Postal Service – Priority Mail | | | | |
| – Print Center | -1-12-1 | jack brown | 5/19/2006 | 1 | 1 |
| –+ TDS450 | -1-20-1 | jack brown | 5/24/2006 | 1 | 1 |
| –+ TDS700 | -1-11-1 | jack brown | 5/19/2006 | 1 | 1 |
| –+ TDS8xx | -1-27-1 | jack brown | 5/24/2006 | 1 | 1 |
| – Document Center | -1-17-1 | jack brown | 5/24/2006 | 1 | 1 |
| – Scan Center | -1-15-1 | jack brown | 5/24/2006 | 2 | 1 |
| –+ TDS800-ms1 | -1-10-1 | jack brown | 5/19/2006 | 1 | 1 |
| –+ TDS700-600 | | | | | |
| –+ TDS700 | | | | | |
| –+ TDS450 COP | | | | | |
| –+ Recycle Bin | | | | | |

Document Set Editor

| Paper Settings | Sheet Details | | | | | |
|---|---|---|---|---|---|---|
| Sheet Name | Sequence | Image Size | Paper Size | Alignment | Rotat |
| - 0222d201 | 1 | 1180.0 x 840 | ISO A0:11 | None | None |

Properties

1-03-1

– Billing
| Bill to | jan jacobs |
| Number | |
| Reference | |
| Reimbursable | No |
| Payment | |
| Reason | |

– Delivery
| Due Date | |
| Delivery Method | Local |
| Recipient | jan jacobs |

– Finishing
| Box | No |
| Double Sided | No |
| Edging | Staple |
| Fold | No |
| Collate | Yes |

PROCESS OF SPECIFYING PRINT TIME FOLD METHOD, LOCATION, AND ORIENTATION

CROSS-REFERENCE TO RELATED APPLICATIONS

This application claims priority under 35 U.S.C. §119(e) to U.S. Provisional Application No. 60/861,724 filed on Nov. 30, 2006, the entirety of which is expressly incorporated herein by reference.

BACKGROUND OF THE INVENTION

1. Field of the Invention

The present invention relates to a method for specifying a fold method for a print job. The present invention also relates to a system for printing where documents for printing are uploaded to a document repository, the documents are prepared for printing, and the printed output may be ordered for distribution.

2. Description of Background Art

Such a configuration is known from, e.g. managing the distribution of design drawings. For design drawings, a fold option is an important feature. Up to now, the fold was specified by giving values to a number of parameters that specify the fold method. However, most of the time the user is not experienced enough to know the effect of the folding settings, in particular since the result is dependent on the format and the orientation of the original document. In addition, the resulting printed and folded output is not readily available for inspection, so that an erroneous folding setting may remain unperceived by the customer. In order to achieve a high accuracy folded output, no matter what paper size or rotation a given (wide format) document possesses, describing what the creator wants was difficult at best when using simple field options.

SUMMARY OF THE INVENTION

An object of the present invention is to overcome erroneous folding settings by a user.

Another object of the present invention is to provide an improved user interface for defining a fold method.

Another object of the present invention is to realize an improved user interface for specifying folding by allowing an image viewer to display a graphical depiction/representation of a fold method for purposes of fold output verification and accuracy when sending a wide format print to an online folder.

When determining a fold method, a location of the fold with respect to a given paper layout and a fold orientation, e.g. portrait versus landscape, a graphical user interface was created to aid the user when printing and folding a wide format document.

In order to achieve a high accuracy folded output, no matter what paper size or rotation a given (wide format) document possesses, and in order to describe what the creator wants in a clear way, the present invention is directed to a method used to display a "picture" or Graphic User Interface (GUI) that makes a "WYSIWYP" (What You See Is What You Print) process advantageous over existing solutions.

The objects of the present invention are achieved in a method for specifying a fold method for a print job, comprising the steps of: displaying a file from the print job, after selection by a user for printing, the file comprising a legend; opening the file in a preview window; displaying markers in corners of the preview window; reading out a user selected marker; reading out a number of user set preprogrammed fold variables from a list of preprogrammed fold variables; and folding based on the user selected marker and the number of user set preprogrammed fold variables.

It should be noted that the term print job encompasses a print request, a folding request, an order or a work order. The equivalent wordings may be used and may be replaced by the term print job.

In an embodiment of the present invention, the list of preprogrammed fold variables comprises at least one of a group variables, the group of variables comprising a fold method, a legend location, a fold width, a fold height, one or more fold options, a first fold exit indication for indicating a delivery method, and a width of a binding edge.

Furthermore, in accordance with an embodiment of the present invention, a system for specifying folding of a print job is provided, the system provides a user interface, comprising: a selection unit that selects a file from the print job; a preview window for displaying an image of the selected file and a graphical representation of a fold method, wherein the graphical representation uses user selectable markers in corners of the preview window; and a properties window for setting one or more preprogrammed fold variables from a list of preprogrammed fold variables.

In an embodiment of the present invention the system may apply one or more rules of a group of rules to achieve a correct folded output. The group of rules may apply to Standard documents, Ericsson documents and Afnor documents, for example. The group of rules comprises a first rule which may be such that, if the user selected marker is in the lower right corner, the image of the selected file will be folded like a Standard document; a second rule that overrules the first rule, the second rule possibly being such that if the user selected marker is in the lower right corner, the image up of the selected file is portrait and the paper size of the image is a size selected from the group comprising A0 and A2, the image of the selected file will be folded like an Afnor document; a third rule possibly being such that if the user selected marker is in the upper left corner, the image of the selected file will be folded like an Ericsson document, a fourth rule possibly being such that if the image up of the selected file is portrait, the image of the selected file will be folded like an Afnor document, and a fifth rule possibly being such that if the image up of the selected file is landscape, the image of the selected file will be folded like a document selected from the group comprising a Standard document and an Ericsson document.

In another embodiment of the present invention, the system may apply a rule being such that if a marker in a corner of an image on the preview window is selected and the image is rotated after the marker has been selected, the selected marker will rotate with the image.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same reference numerals have been used to identify the same or similar elements throughout the several views.

Figure 1:
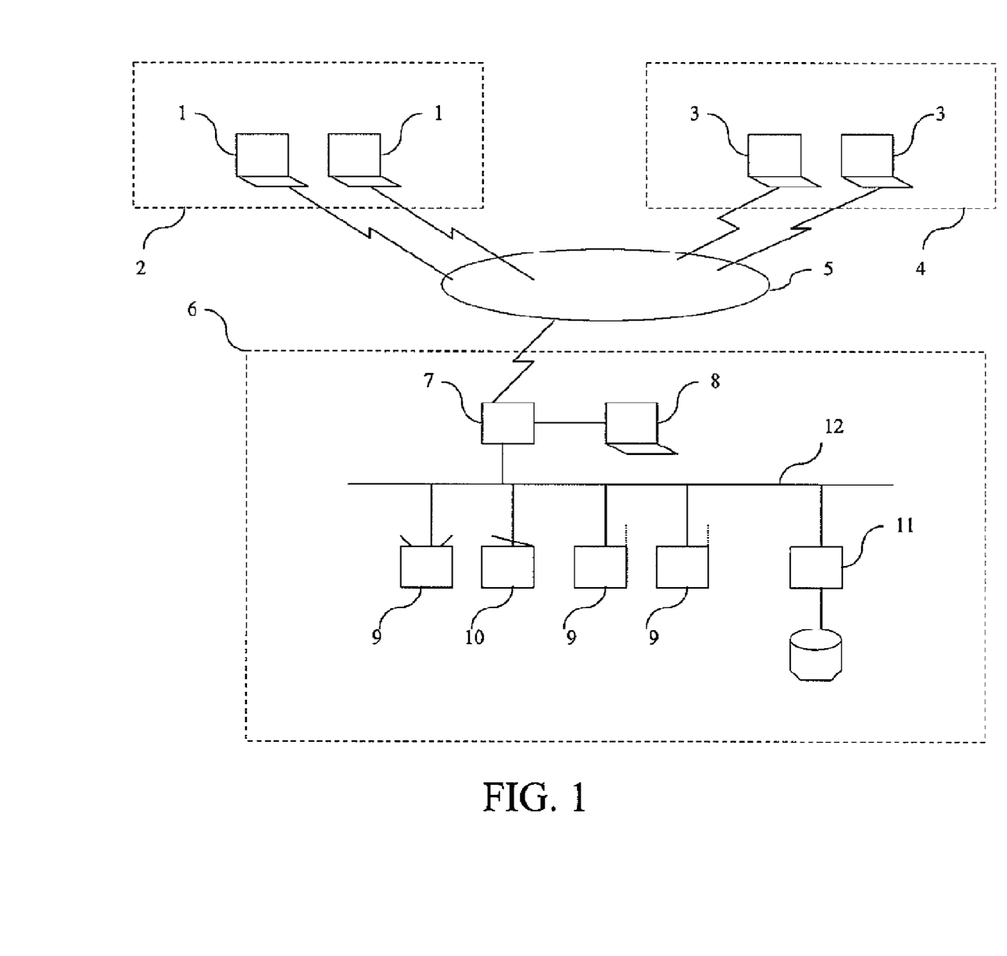
FIG. 1 is a diagram showing a network system configured for employing an embodiment of a method according to the present invention.

FIG. 1 schematically illustrates a network system configured for using an embodiment of the method according to the present invention. The network system comprises one or more client workstations 1 on a location 2 and one or more client workstations 3 on a location 4, connected via a network 5 to a job printer site 6. The network 5 may be, for example, a wide area network, such as the Internet. The job printer site 6 comprises an entry station 7, connected to one or more managing workstations 8. The entry station 7 is connected via an internal network 12, such as a local area network, to one or more printers 9, one or more scanners 10, and a document storage station 11 for storing print files. The client workstations 1, 3 may be geographically spread over a variety of locations 2, 4. The printers 9 are typically located at the job printer site 6. Customers may upload drawings from a client workstation 1, 3 to the job printer site 6 for storage. Thereafter, the uploaded drawings are available for ordering print outs by the same customer or by other customers upon invitation. In order to obtain print outs, a customer at a client workstation 1, 3 may create a print job and submit the job to the job printer site 6.

An incoming print job may be made available in a job management service, also referred to as a job center at a managing workstation 8 at the job printer site 6. A job may be checked by an operator at the managing workstation 8 in order to determine whether further preparation is necessary, e.g. scanning of paper originals and the like. The print order form may be further administratively handled and checked regarding accounting issues. Further, it may be checked if required finishing options are available at the job printer site 6. If not, the job may be rerouted to another site.

The job is then routed to a print management service, also referred to as a print center, or it is stored in a document repository, also referred to as a document center. Both services are available at the managing workstation 8 of the job printer site 6.

The job may be placed in a print queue and/or stored in a document storage station 11 for reprint in dependence on a request of a customer. After printing, the printed output may be physically distributed to the addressees indicated and invoices may be prepared and logged.

The job management service may manage jobs from various sources. For example, it may provide operator facilities for changing job specifications, routing jobs to printers and performing other job management tasks. It may have facilities for routing incoming jobs to the print center automatically.

The print management service provides complete centralized print management. It enables the operator to, among other things, balance the workload among printers, cancel print jobs, redirect print jobs, reprint jobs, and change print quantities.

The scan management service, also referred to as a scan center, provides central management of scanners and the ability to index, catalog, print and archive scanned images.

The document management service may be a local document archive that provides retrieval of print-ready documents. Actual storage may take place at the document storage station 11; operation may be provided via the functionality of the document center offered at the managing workstation 8.

Figure 2:
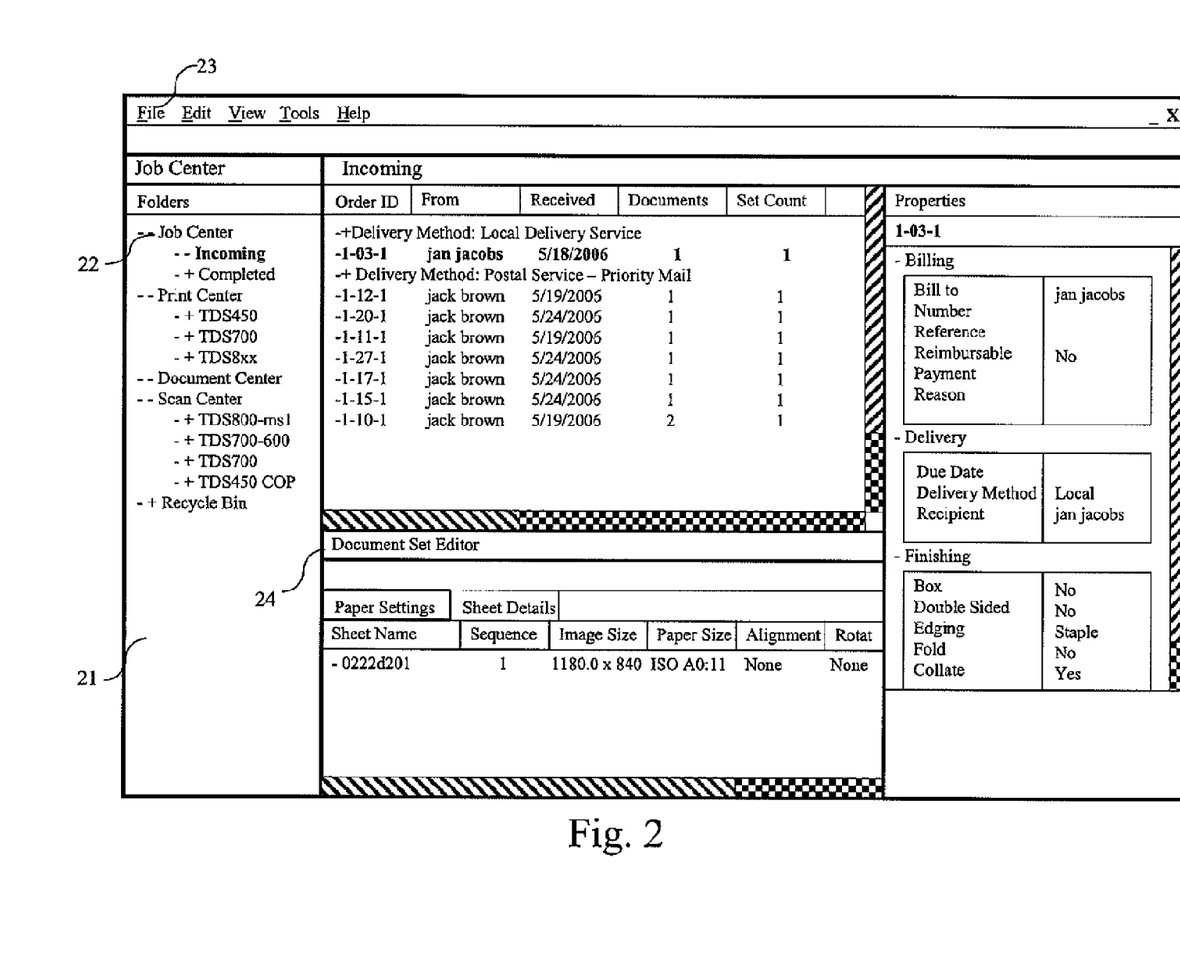
FIG. 2 shows an operating screen of a managing workstation, being part of the network system, suitable for use in an embodiment of the method according to the present invention.

FIG. 2 shows an operating screen of the managing workstation 11 (FIG. 1). In the left pane 21, comprising a tree like structure, the above mentioned services are made available.

Prior to use of the system, an administrator of the system should prepare a number of folding configurations under different names. In relation to the present invention, these may be preprogrammed folding options. It is possible to include finishing options like punching in a prepared folding configuration. The term finishing configuration may be used instead of the term folding configuration. Prepared folding configurations may be made available for selection in a work order form by a user. The system is designed in such a way that the combination of the chosen prepared folding configuration and the selected corner of the drawing results in actual folding of the printed output as desired by the user.

A job may be carried out on a set of original images, further referred to as a document set. A document set may consist of files and their properties, including the properties that specify how the files are to be printed. The term "document set" is used throughout the system: each time the term refers to a collection of original documents or files with their properties. It may be used as a work order in the job center; a print set in the print center; an issue in the document center; and a scan set in the scan center.

In order to specify a job, a job center folder 22 in the left pane 21 may be clicked in the tree like structure if an operator wants to indicate a desired order. On a file menu option 23, new jobs may be pointed to (not shown) and new orders may be clicked (not shown). Another pane shows a document set editor 24. Files may be added, properties of files may be changed, files may be processed and WYSIWYP previews may be generated.

Figure 3:
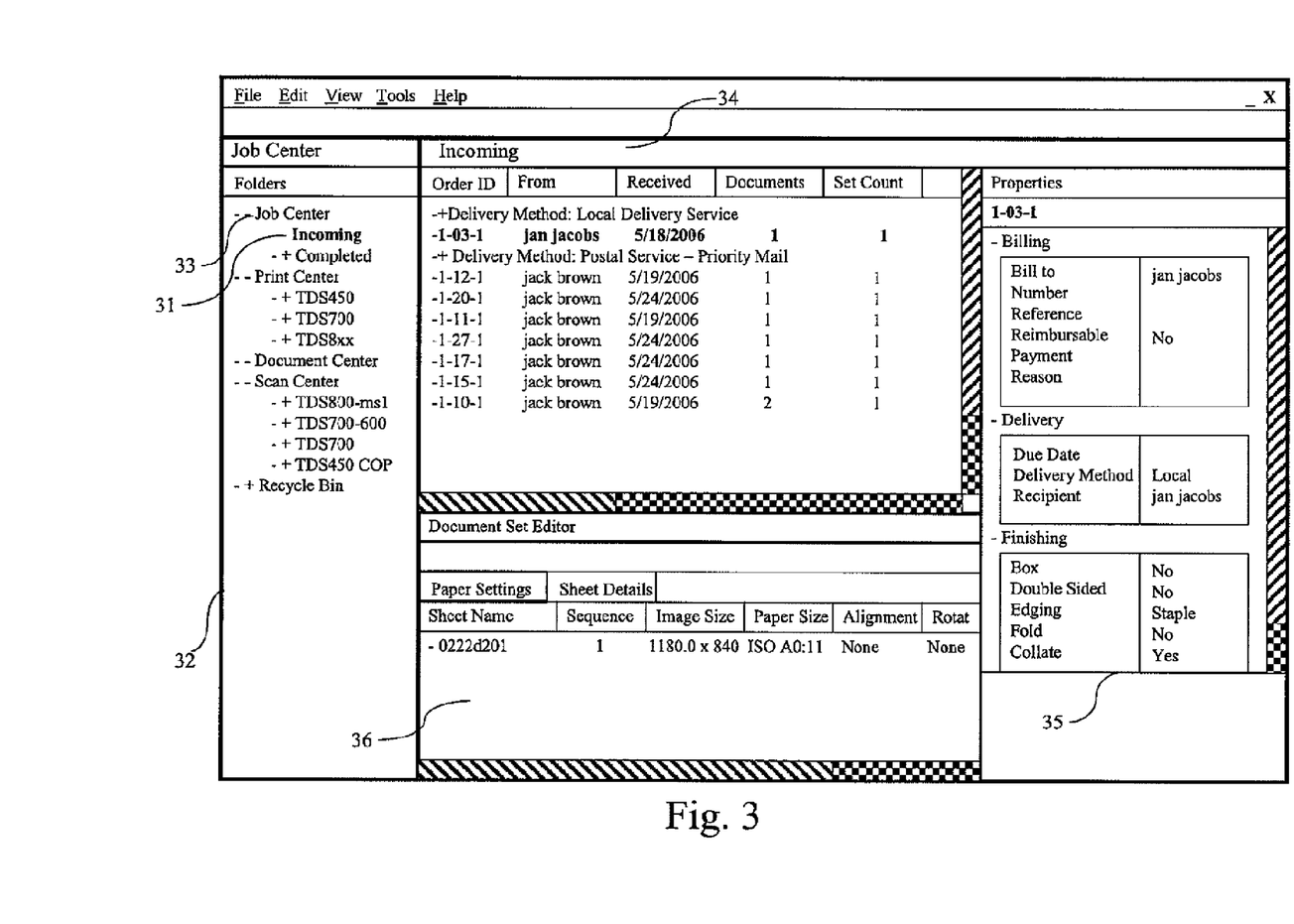
FIG. 3 shows the operating screen of the managing workstation of FIG. 2 including the job center to modify jobs.

Jobs uploaded or defined as above arrive at the job center. At the job center, the operator may modify the jobs (FIG. 3). Upon selecting "incoming" 31 in the left pane 32 under the job center 33, a list of incoming jobs is shown in an incoming job pane 34. Upon selecting an incoming job in the incoming job pane 34, a properties pane 35 at the right displays the properties of the job, and files making up the job are shown in a document set editor pane 36 (one in the case given in FIG. 3).

Figure 4:
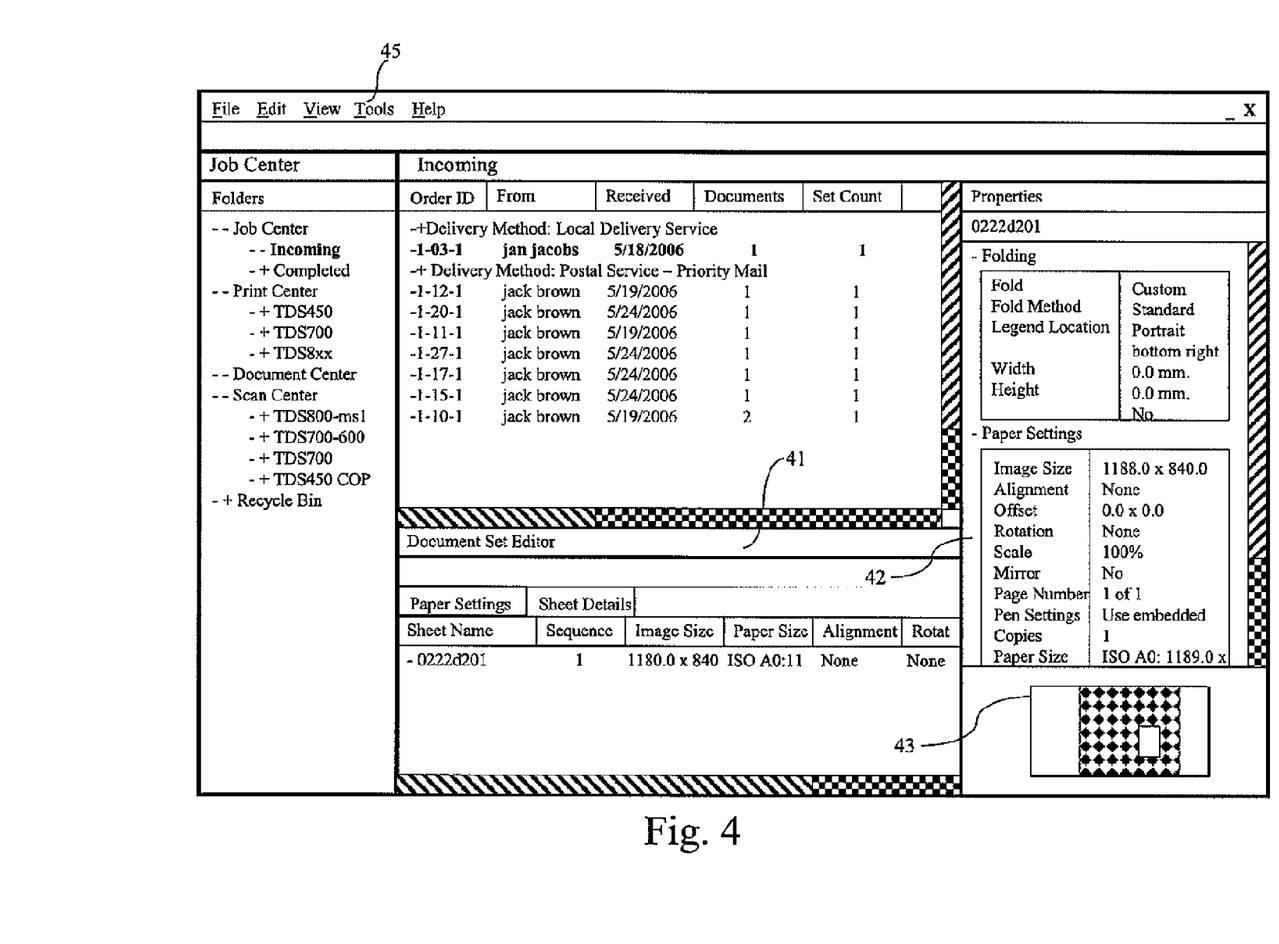
FIG. 4 shows the operating screen of the managing workstation of FIG. 2 including a document set editor pane and a properties pane.

Upon selection of a file in the document set editor pane 41, in a properties pane 42 at the right hand side, the properties of the selected file are shown (FIG. 4). An icon 43 is available for providing a preview of the selected file. The preview is opened in a separate screen as shown in FIG. 5.

A job being defined by way of a document set, wherein each document has its settings regarding printing, may be stored in the document center for later retrieval and for printing, and may be sent to the print center for printing.

Figure 5:
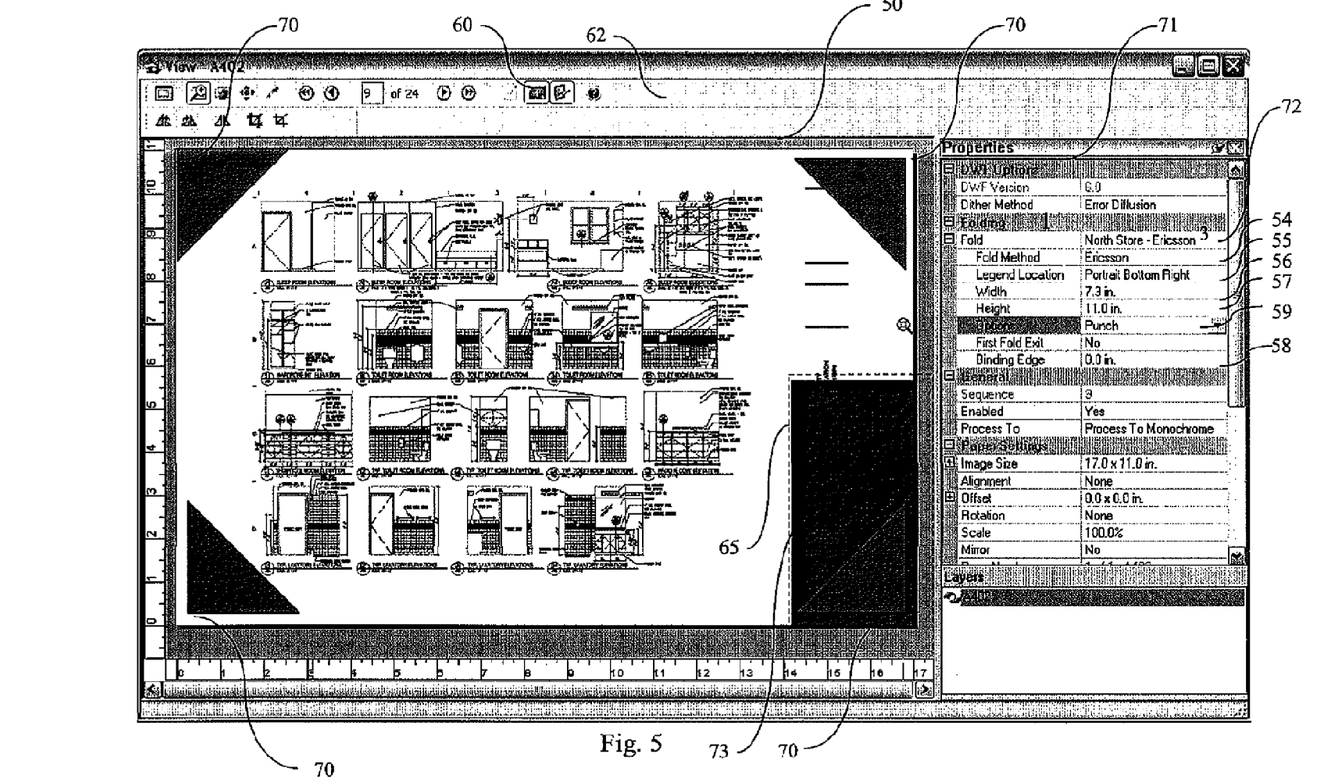
FIG. 5 shows a preview screen showing a preview of a selected file.

Folding may be specified in a preview window 50 as shown in FIG. 5. Further, FIG. 5 shows a show/hide fold depiction button 60 located on a toolbar 62 for indicating the showing or hiding of a fold depiction in an area 65, fold friendly name presets 72, a fold method 54, a fold legend location 55, a fold width 56, a fold height 57, a fold binding edge 58, and fold options 59.

The show/hide fold depiction button 60 may include an option On icon and an option Off icon. For a depiction of fold 52 (Size X by Y) an option On grey image and an option Off grey image exist, both options located exactly on an area 65 defined by the fold legend location 55 of a legend 73. The fold friendly name presets 72 comprise a combination of all values tied to a single friendly name in order to quickly set all values of variables with reference numerals 54 up to 59. The fold method 54 may be one of a group comprising a Standard method, an Ericsson method and an Afnor method. The fold legend location 55 may be one of the group portrait top right, portrait top left, portrait bottom right, portrait bottom left, landscape top right, landscape top left, landscape bottom right and landscape bottom Left. The fold width 56, the fold height 57 and the fold binding edge 58 may be a width in standard units or metric units. The fold options 59 may comprise punching, reinforcing and a first fold exit option.

To specify a folding method a user may select one of the corners 70 in the preview window 50 and may select a folding name 72, such as North Store and Ericsson among others, for example, in a properties pane 71 on the right hand side. On the location of the folding name 72, a dropdown list is available showing all available preprogrammed finishing configurations.

Figure 7A:
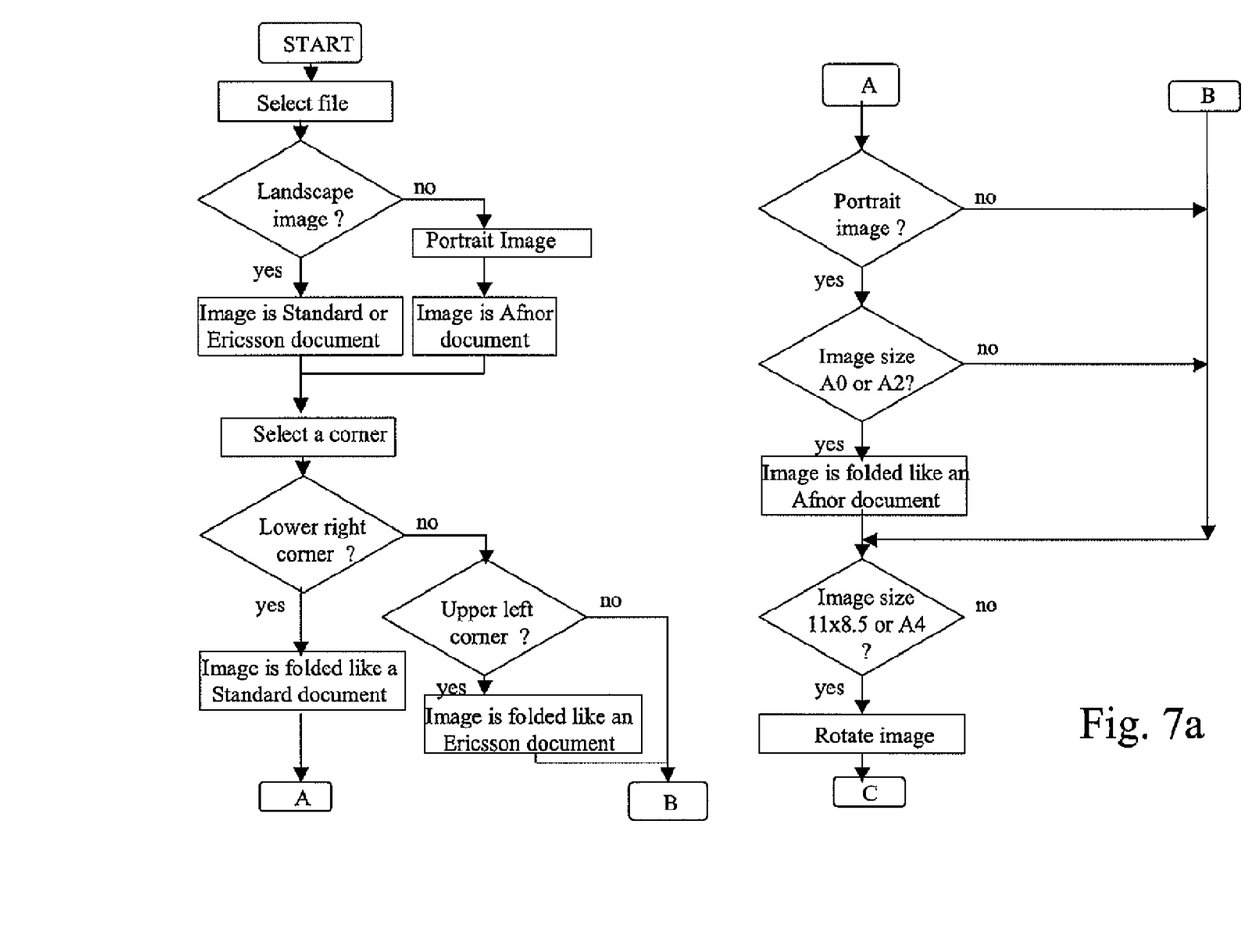
FIGS. 7a-7b show a workflow diagram for handling a document that needs to be folded.
Figure 7B:
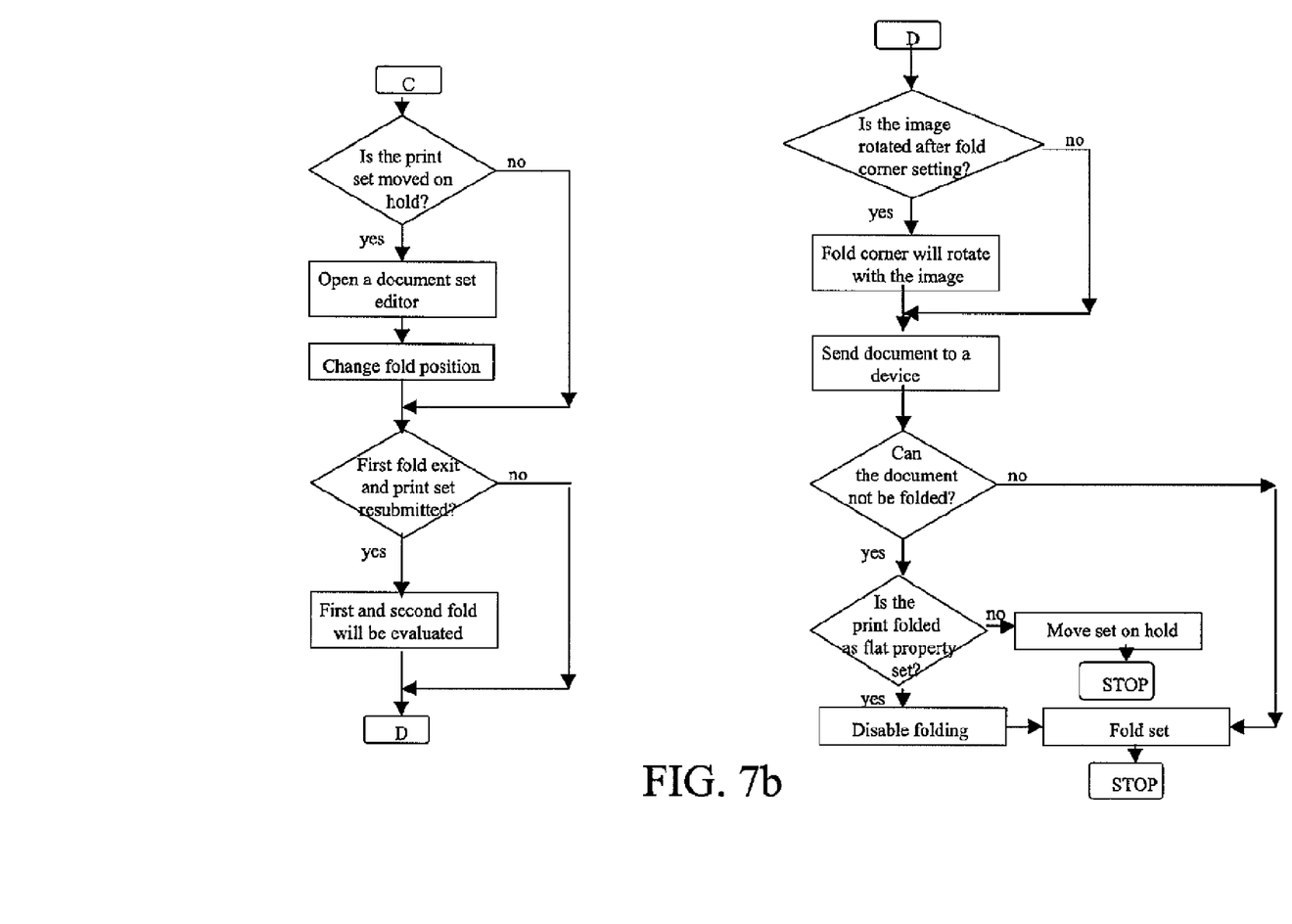

An image of a selected file, which image has been intended to be folded, may be assumed to be right reading. The system may apply one or more rules as shown in FIG. 7a and FIG. 7b in order to achieve a correct folded output. A first rule may be such that if the user selected marker is in the lower right corner, the image of the selected file will be folded like a Standard document. A second rule that overrules the first rule may be such that if the user selected marker is in the lower right corner, the image up of the selected file is portrait and the paper size of the image is a size selected from the group comprising A0 and A2, the image of the selected file will be folded like an Afnor document. A third rule may be such that if the user selected marker is in the upper left corner, the image of the selected file will be folded like an Ericsson document. A fourth rule may be such that if the image up of the selected file is portrait, the image of the selected file will be folded like an Afnor document. A fifth rule may be such that if the image up of the selected file is landscape, the image of the selected file will be folded like one of a group comprising a Standard document and an Ericsson document.

To make sure that the feed path accepts the largest width, an image with formats 11×8.5 or A4 may be rotated. By rotating the image in this situation no fold will occur. Changing a delivery method to a first fold exit method and resubmitting the print set may still result in both the first and second fold being evaluated, not just the first fold. If a print set is moved on hold for any folding reason, the operator may open the print set in the document set editor and may change the fold position in order to fold the print set without error. If sending a document to a device that may have no possibility to fold, a property such as "print folded as flat" of a print device enabler may be checked, resulting in the folding being disabled if the property is set, and resulting in the document being moved on hold, if the property is not set. Once a fold corner (i.e. a marker) has been set on a given image by a user, the fold corner indicating where the legend is located, the fold corner may rotate with the image, if the image is rotated after the fold corner/legend location is set.

System wide folding settings may be set under a submenu item "options" (not shown) on a tools menu 45 (FIG. 4) and the submenu item "options" comprising a submenu item "General" (not shown), which comprises a submenu item "Folding" (not shown). By clicking the submenu item "Folding" the following options may be selected:

"display fold settings," meaning that the fold method and legend location is displayed in the properties pane, in which pane properties may be set for each drawing. Further, a button may be displayed in the toolbar of the preview window for showing the legend location;

"default fold method," meaning a default fold style for printed drawings. One of the group Afnor folding, Ericsson folding and Standard folding may be selected for DIN folding, or an option "None" for no default folding method. In the properties pane 71 on FIG. 5 the fold method for an individual drawing may be changed; and "default legend location," meaning a legend location associated with drawings by default. In the properties pane 71 the location for an individual drawing may be changed. A legend location that is not compatible with the fold method and paper size may not appear in the properties pane 71, even if the location is the default location.

A list of folding options may be displayed in the properties pane 71 and in work orders. The list of folding options may be configured under "Options" on the tools menu 45, under an submenu item "Environment," by clicking on submenu item "Folding" (not shown). The sequence of the list of folding options may be changed, so the most common or preferred folding options may appear at the top. The following options to change the sequence of the list of folding options may be available:

"new" in order to open a dialog box where a folding option may be added;

"remove" in order to delete a selected option;

"move up" in order to move up a selected option one position in the list;

"move down" in order to move down a selected option one position in the list;

"folding enabled" in order to display folding information by default when drawings are added;

"method" in order to show a folding method associated with a selected option;

"legend location" in order to show a legend location associated with a selected option;

"none," being a folding option with no additional finishing;

"punch," being a folding option in which output is punched;

"reinforce", being a folding option with a reinforcement strip added to the output;

"first fold exit," being a folding option in which output is folded in one direction only and then delivered into the first fold tray;

"width," being a width of a folded output, the unit of measure of which may be changed on a submenu of the toolbar of the preview window;

"height," being a height of a folded output, the unit of measure of which may be changed on a submenu of the toolbar of the preview window; and "binding edge," being a size of the binding edge, the unit of measure of which may be changed on a submenu of the toolbar of the preview window.

Handling of a job is done in the print center. The print center provides complete centralized print management. It enables an operator to, among other things, balance the workload among printers, cancel print jobs, redirect print jobs, reprint jobs, and change print quantities.

Document sets can be dragged from the job center, the document center and the scan center to the print center, a printer group or a printer.

The system may be configured to automatically route every print request that arrives in the incoming folder of the job center to the print center. This option may be available as a check box on a job automation dialog box of a submenu of the options menu in order to activate an automatic move to the print center. In order to prevent a user of the system from routing requests from the print center to printer groups, the checkbox may be unchecked at the arrival of print requests at the print center, resulting in turning off the option of automatically moving the print request to the print center.

When a print request arrives at the print center, the system compares requirements of the print request to capabilities of available printer groups. Specifically, the system may check whether each printer group can handle one or more of the following aspects of the print request: file formats, folding requirements, media types and media sizes, for example.

The print center then routes the print request to a suitable printer group, based on the result of the check for capabilities, as follows:

when exactly one printer group has all capabilities required by a request in the print center, the request is routed to that printer group;

when no printer group has all capabilities required by a request in the print center, the dispatcher may treat this request manually; and when more than one printer group has all capabilities required by a request in the print center, the print center routes the request to the printer group that has the shortest estimated time to complete the order When a print request arrives at a printer group, the dispatcher determines which printer or printers to use for each document, based on at least one of the following criteria: file formats supported, media supported and folding capabilities, for example.

Within the printer group the following rules may apply to assign a file to a printer as follows:

when exactly one printer has all required capabilities, the print center routes the request to that printer;

when no printer has all required capabilities, the print center does not allow the request to be moved to the printer group;

when more than one printer has all required capabilities, the print center routes the request based on a load balancing property configured for the printer group, the load balancing property being one of the group comprising parallel load balancing, sequential load balancing and consecutive load balancing.

In the case of parallel load balancing, all printers are used to print an equal number of sets, in case of sequential load balancing each job is sent to a single printer and the page count of all printers is kept approximately equal. In the case of consecutive load balancing, each job is sent to a single printer and a job count of all printers is kept approximately equal.

Figure 6:
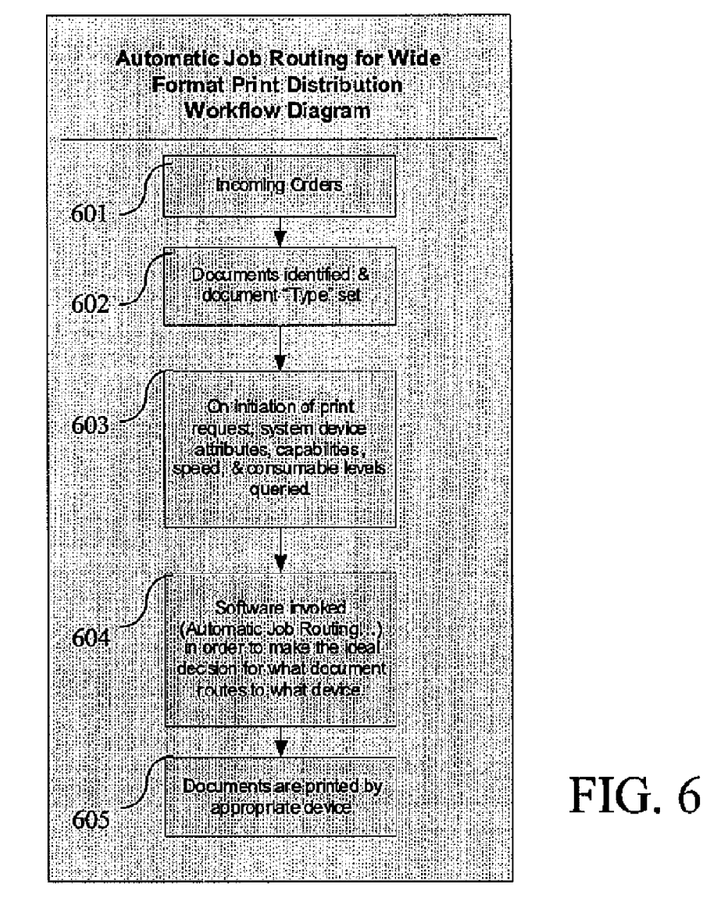
FIG. 6 shows a workflow diagram where preprogrammed folding configurations are made available by an administrator for a remote customer at a client workstation running a package being part of a publishing system.

FIG. 6 shows a workflow diagram where preprogrammed folding configurations are made available by an administrator for a remote customer at a client workstation running a package being part of a publishing system. The workflow may comprise four steps 602, 603, 604 and 605. Documents of a couple of incoming orders 601 are identified and a document type is set (step 602). Upon initiation of a print request, system device attributes, capabilities, speed and consumable levels are queried (step 603). Software is invoked for automatic job routing in order to make the ideal decision for which document routes to which device (step 604). The documents are printed by appropriate devices (step 605).

An example of a typical system workflow is provided below.

For printing an order from a plan center, a contractor or another document buyer may visit an online plan room and may order documents that were published there by an architect, engineer, or designer. When synchronization occurs, the order appears in the job center. The order may be dragged to the print center to be printed. On a window for the job center, a folding method and other folding properties may be set as described in the previous figures.

For printing an order in a drop box from a publisher system, an architect, engineer or designer may use a publisher system to locate a drop box and send documents and a work order. When synchronization occurs, the documents and order appear in the job center. Before printing the order, the sender telephones and asks the operator of the system to apply a "Not for construction" stamp to the documents. The documents may be opened in the document set editor, the stamp may be applied, and then the order may be dragged to the print center to be printed.

For printing an order in a drop box from a job submission tool, a construction project manager may use a job submission tool to locate a drop box and send documents and a work order. When synchronization occurs, the documents and order appear in the job center. Because a job submission tool may permit users to send any type of document, the document set editor may be used to make sure that the documents are valid and can be printed. Some of the documents may be PDF color plot files, which the system may not currently process in WYSIWYP (What You See Is What You Print) preview mode. For that reason, the documents may be marked as "Do Not Process" to allow the controller in the printer to process the image. Then, the order is dragged to the print center, which automatically routes the PDF color plot files to a printer that natively supports PDF color processing.

For publishing files to the plan center, a customer may give a CD that contains files and may ask an operator to have them published in the plan center. In the document center, a folder may be created that represents the account and, within that folder, a folder that represents the project. Within the project, an issue may be created and an attribute may be selected to synchronize the issue with the plan center. With the document set editor, the files may be added to the issue, and may be processed to a large document format. When the next synchronization occurs, the documents appear in the plan center online plan room. It may be decided to invite the customer to view, manage, and order the online documents and to invite other users to order them. The operator may log in to the plan center, navigate to the project just created, and enter the customer's name and email address to send an invitation.

For scanning and archiving documents, a customer may provide the operator with printed drawings and may request to scan the drawings and archive the resulting digital scan files. A scan set may be created in the scan center and the drawings are scanned. In the document set editor, the drawings may be indexed and catalogued by setting their sheet name, description, revision, and author. In the document center, a folder may be created, which folder represents the account and, within that folder, a folder that represents the project. Within the project, an issue may be created. Then, the drawings may be dragged from the document set editor into the issue and the drawings may be deleted from the scan center.

For importing, printing and archiving an older document system, a job file from an older version of a document system may be used in the described system by creating a folder structure in the document center that represents the account, project, and issue. In the document set editor, the job may be imported and the files may be processed. Thus, the documents may be archived. To print a set, the issue may be dragged to the print center.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for specifying a fold method for a print job, comprising the steps of:
    displaying a file from the print job, after selection by a user for printing, the file comprising a legend;
    opening the file in a preview window;
    displaying markers in corners of the preview window;
    reading out a user selected marker, after selection of a displayed marker by a user;
    reading out a number of user set preprogrammed fold variables from a list of preprogrammed fold variables comprising a fold method and a legend location; and
    folding based on the user selected marker and the number of user set preprogrammed fold variables.

2. The method according to claim 1, wherein the list of preprogrammed fold variables comprises at least two of a group of variables including a fold method, a legend location, a fold width, a fold height, one or more fold options, a first fold exit indication for indicating a delivery method, and a binding edge width.

3. A system for specifying folding of a print job, the system including a managing workstation providing a user interface, comprising:
    a selection unit that selects a file from the print job;
    a preview window displayed on the managing workstation for displaying an image of the selected file and a graphical representation of a fold method, wherein the graphical representation uses user selectable markers in corners of the preview window; and
    a properties window displayed on the managing workstation for setting one or more preprogrammed fold variables from a list of preprogrammed fold variables comprising a fold method and a legend location.

4. The system according to claim 3, wherein the system applies a rule being such that if a marker in a corner of an image on the preview window is selected and the image is rotated after the marker has been selected, the marker will rotate with the image.

5. A system for specifying folding of a print job, the system including a managing workstation providing a user interface, comprising:
    a selection unit that selects a file from the print job;
    a preview window displayed on the managing workstation for displaying an image of the selected file and a graphical representation of a fold method, wherein the graphical representation uses user selectable markers in corners of the preview window; and
    a properties window displayed on the managing workstation for setting one or more preprogrammed fold variables from a list of preprogrammed fold variables,
    wherein the system applies one or more rules of a group of rules in order to achieve a correct folded output, the group of rules including:
    a first rule being such that if a user selected marker is in the lower right corner of the preview window, the image of the selected file will be folded like a Standard document;
    a second rule that overrules the first rule, the second rule being such that if a user selected marker is in the lower right corner of the preview window, the image up of the selected file is portrait and the paper size of the image is a size from the group including A0 and A2, the image of the selected file will be folded like an Afnor document;
    a third rule being such that if a user selected marker is the upper left corner of the preview window, the image of the selected file will be folded like an Ericsson document;
    a fourth rule being such that if the image up of the selected file is portrait, the image of the selected file is will be folded like an Afnor document; and
    a fifth rule being such that if the image up of the selected file is landscape, the image of the selected file is will be folded like one of the group including a Standard document and an Ericsson document.

* * * * *